(No Model.)
G. F. SCHILD.
ATTACHMENT FOR MAPS OR CHARTS.
No. 332,167. Patented Dec. 8, 1885.
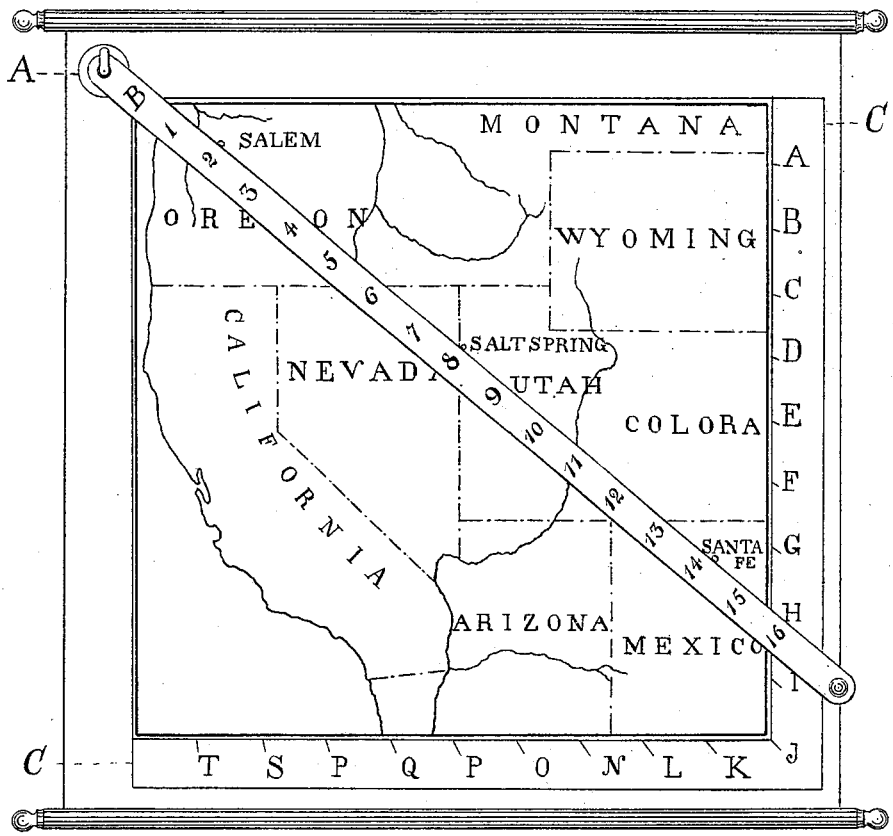
Fig 1
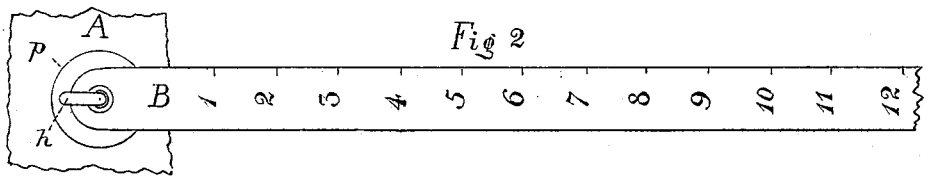
Fig 2
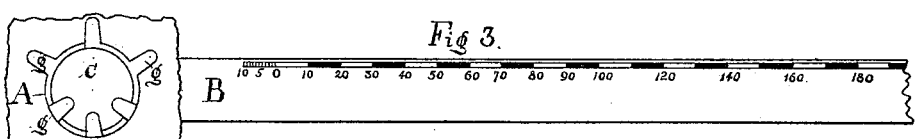
Fig 3.
Fig 4
| Names | Letter | Number |
|---|---|---|
| Salem | H | 2 |
| Salt Spring | H | 8 |
| Santa Fe | H | 14 |
Witnesses
Geo. W. Simonton
Chas. R. Stevens
Inventor
George F. Schild

UNITED STATES PATENT OFFICE.

GEORGE F. SCHILD, OF VALLEJO, CALIFORNIA.

ATTACHMENT FOR MAPS OR CHARTS.

SPECIFICATION forming part of Letters Patent No. 332,167, dated December 8, 1885.

Application filed July 17, 1884. Serial No. 137,934. (No model.)

*To all whom it may concern:*

Be it known that I, GEORGE F. SCHILD, a citizen of the United States, residing at Vallejo, in the county of Solano and the State of California, have invented a new and useful Attachment to Maps and Charts, of which the following is a specification.

My invention relates to improvements in attachments to maps and charts of every kind, to be used in finding quickly any name contained thereon, and also the distances. To obtain this object ordinarily the maps and charts have been subdivided into minute squares by lines intersecting each other at right angles, and numbered and lettered on the margin of the maps. An index accompanying the maps and charts gave all the names contained thereon and the squares in which the names were to be found by the corresponding number and letter on the margin. Through the many lines drawn on the maps the same became indistinct, and in consequence of following these lines with the fingers to find the squares the maps soon became soiled and unsightly. I overcome these objections by the use of the attachment illustrated in the accompanying drawings, in which—

Figure 1 is a map showing the complete attachment. Fig. 2 is a plan of the ruler and hook-plate. Fig. 3 is a back view of the hook-plate and ruler. Fig. 4 illustrates the general feature of the index.

Similar letters refer to similar parts throughout the several views.

Fig. 1 shows a map with the attachment, consisting of the hook-plate A, fastened to the upper left-hand corner of the map, the wooden or metal strip or ruler B, with the running numbers printed thereon, and the paper strips C C, with the capital letters of the alphabet glued around the lower and right-hand edge or margin of the map. On new maps I propose to dispense with these paper strips, and to print the letters of the alphabet around the margin of the map, and, if necessary, two or more alphabets in different colors.

Fig. 2 shows the hook-plate A, consisting of the plate $p$, the attached hook $h$, also the ruler B, with the running numbers printed thereon hanging to it.

Fig. 3 shows a back view of the hook-plate A and the back of the ruler B, with the scale of the map printed thereon. The figure illustrates the manner of fastening the same to the maps and charts. The prongs $g\,g\,g$, radiating from the periphery of the plate $p$, pierce the maps, and are bent over the plate $c$ on the back, securing thereby the hook-plate to the map, and distributing the strain on the map over a larger surface. The back of the ruler B shows the scale of the map. Maps are furnished with small scales only printed thereon, and to find distances compasses have to be used to space them off. The scale on the back of the ruler will facilitate greatly this operation.

Fig. 4 illustrates the general arrangement of the index. Each map and chart furnished with this attachment is accompanied by a book or index, giving all the names of places contained thereon and the numbers and letters corresponding to them on the map. The index may give also the State, county, and number of inhabitants of the place, &c.

To find any place on the map, look in the index for the corresponding number and letter, lift with the right hand the ruler B to the letter on the margin of the map, and follow with your eye down the ruler until you get to the number, at which point the place will be found.

Fig. 4 gives the letters and numbers of three places to be found on the map shown in Fig. 1, namely: for Salem, H 2; for Salt Spring, H 8; for Santa Fé, H 14.

To find the distance from one place to another, length and breadth of States, &c., unhook the ruler and make use of the scale on its back.

On maps in book form I propose to have in place of the hook on the hook-plate an eye, and the hook attached to the ruler.

Having described my invention, what I desire to claim and secure by Letters Patent is—

The combination of map and scale, the map having a hook-plate on its upper left-hand corner and showing the letters of the alphabet in running order along the right-hand and lower margin, the scale, with which distances may be measured upon the map, being on one side of a ruler, which is attachable to the hook-plate, of a length equal to the diagonal line of the map, and which shows upon its other side the running numbers adapted to be used in connection with an index containing the names of all places upon the map, with letters and numbers facilitating the search for such places as are to be determined upon the map, all substantially as shown, for the purpose specified.

In witness whereof I have hereunto set my hand.

GEORGE F. SCHILD.

Witnesses:
 GEO. W. SIMONTON,
 R. V. E. COUNTRYMAN.